United States Patent [19]

Schull et al.

[11] Patent Number: 5,359,641
[45] Date of Patent: Oct. 25, 1994

[54] TELEMETRY SYSTEM WITH SUPPRESSED RINGING CONNECTION

[75] Inventors: Jerome W. Schull, Marietta; James T. Soles, Clarkstown, both of Ga.

[73] Assignee: Bellsouth Corporation, Atlanta, Ga.

[21] Appl. No.: 995,031

[22] Filed: Dec. 22, 1992

[51] Int. Cl.⁵ .......................................... H04M 11/00
[52] U.S. Cl. ..................................... 379/106; 379/107
[58] Field of Search ........................ 379/93, 95, 97, 98, 379/102, 103, 105–107, 9–11, 14–16, 18, 28

[56] References Cited

U.S. PATENT DOCUMENTS

| | | | |
|---|---|---|---|
| 4,455,453 | 6/1984 | Parasekvakos et al. | 379/107 |
| 4,540,849 | 9/1985 | Oliver | 379/107 |
| 4,583,124 | 4/1986 | Tsuji et al. | 379/93 |
| 5,031,207 | 7/1991 | Hesdahl et al. | 379/93 |
| 5,128,988 | 7/1992 | Cowell et al. | 379/106 |
| 5,166,975 | 11/1992 | Maei | 379/93 |
| 5,189,694 | 2/1993 | Garland | 379/106 |

FOREIGN PATENT DOCUMENTS 0474407  3/1992  European Pat. Off. .

Primary Examiner—Wing F. Chan
Attorney, Agent, or Firm—Robin, Blecker, Daley & Driscoll

[57] ABSTRACT

An improved telemetry system in which suppressed ringing connections are established through a switching network to access equipment at subscriber locations. The control equipment for controlling the switching network is specifically adapted to include a set-up routine for identifying the signalling modes for the loop networks connected to the subscriber locations. The control equipment additionally is adapted to permit access by a user of the telemetry system to a subscriber location by first using a no signal signalling mode and, if unsuccessful, an identified signalling mode for the subscriber location. Finally, the control equipment is also adapted to automatically generate telemetry system information for each subscriber location from telephone system and user customer information so that the telemetry system and user customer information are linked by a common reference ID associated with the equipment at a subscriber location.

60 Claims, 5 Drawing Sheets

TELEMETRY SYSTEM WITH SUPPRESSED RINGING CONNECTION

BACKGROUND OF THE INVENTION

This invention relates to telemetry systems and, in particular, to telemetry systems using suppressed ringing telephone connections.

Published European Patent Application No. 0 474 407 A1 discloses an improved telemetry system in which a utility company is able to monitor utility meters at telephone subscriber locations via telephone loop networks serving the subscriber locations. In the '407 application, this is accomplished via a suppressed ringing connection effected through the central office switch serving the subscriber locations.

The system of the '407 application includes a central office service unit which communicates with a utility controller or computer. The central office service unit connects to the trunk unit of the central office switch via utility telemetry trunks which provide a suppressed ringing connection service. As described in the '407 application, the central office service unit and utility telemetry trunks enable a connection to be made through the switch to a desired subscriber location without ringing the telephone at the location.

Once the connection is established, a meter interface unit connected to the loop network can then be alerted by a message transmitted to the unit. The unit can then be instructed by the utility computer to obtain and report data from a utility meter at the subscriber location.

As further described in the '407 application, where the loop network connected to a subscriber location contains certain types of loop carriers, the suppressed ringing connection may require a short burst of signal in order to initiate the loop carrier so that the desired connection can be made. Furthermore, different loop carriers may require different length burst signals. These signals, however, must be kept relatively short so that they terminate before a connection is made so that no or little ringing occurs at the subscriber location.

In the system of the '407 application, a signal code, i.e., a start signal of specific length (e.g., 0, 20 ms, etc.), is included in the signal transmitted to the switch from the central office service unit. This signal code identifies to the switch the signalling mode (i.e., no signal or burst signal of particular extent) required to be used with the loop network through which the suppressed ringing connection is being established. The presence of the signal code thus enables the switch to invoke the appropriate signalling mode to complete the desired connection.

While the '407 application discloses a beneficial suppressed ringing type telemetry system, the disclosed system suffers from certain drawbacks. One drawback is that the system does not provide a mechanism for automatically identifying the signalling mode of the loop network serving a given subscriber location. While a manual process can be used to make this identification and the resultant signal codes for the identified signalling modes stored for use by the system, this is a time consuming and costly process and may result in inaccuracies.

Additionally, in the system of the '407 application, a given signalling mode is established for each subscriber location. However, if the loop network serving a location should be changed, the established signalling mode may no longer be correct. This can result in connections not being made or in ringing at the subscriber location, both of which are undesirable.

Finally, in the system of the '407 application, the utility computer accesses a utility meter interface at a subscriber location by providing a directory number to the central office service unit. This directory number and other telephone system information related to a subscriber location is supplied to the utility by the telephone company. The utility correlates this telephone system information with its own utility customer information so that there is proper correspondence between directory numbers and the utility customers.

However, directory numbers may change as result of disconnects, requests by subscribers or other circumstances. Also, directory numbers for new subscriber locations may not be readily available for transmitting to the utility. As result, a great deal of manual coordination is required between the utility and the telephone company to ensure proper correlation of the directory numbers to the subscriber locations.

It is, therefore, an object of the present invention to provide a telemetry system which does not suffer from the above drawbacks.

It is a further object of the present invention to provide a telemetry system in which the signalling modes for the loop networks serving the subscriber locations can be easily and automatically determined.

It is a further object of the present invention to provide a telemetry system in which the suppressed ringing connections are effected in a manner which minimizes any undesired ringing at the subscriber locations and/or any failures to connect resulting from changes in the loop networks serving these locations.

It is yet a further object of the present invention to provide a telemetry system in which telemetry system information is automatically and easily developed based on user customer information and telephone system information and is readily accessible by the telemetry system user.

SUMMARY OF THE INVENTION

In accordance with the principles of the present invention, the above and other objectives are realized in a telemetry system of the above type by suitably adapting the control means used to control the switching network of the system. In particular, the control means is first adapted to be able to automatically identify the signalling modes of the loop networks serving the subscriber locations.

To this end, the control means includes a set-up routine in which the control means controls the switching network to sequentially attempt to establish suppressed ringing connections to a subscriber location using a different signalling mode in each attempt. After each attempt, the control means then waits for an acknowledgement signal from the subscriber location before proceeding with the next attempt. When an acknowledgement is received, the control means ceases its sequential connection attempts and identifies the signalling mode resulting in the acknowledgement with the loop network serving the subscriber location. This set-up routine is used by the control means when the telemetry system is initialized or when a new subscriber location is added to the system. It is also used when a connection cannot be made to establish an appropriate signalling mode for making the connection.

In further accord with the invention, the control means of the telemetry system is also adapted to include a unique access routine for processing user requests. In this routine, the control means controls the switching network to first attempt to make a suppressed ringing connection to a subscriber location using a preselected signalling mode (i.e., the no signal signalling mode). If this attempted connection fails, the control means then controls the switching network to further attempt to make the suppressed ringing connection using a signalling mode identified for the subscriber location. Finally, if this further attempt also fails, then the control means returns to the set-up routine to re-identify a signalling mode for the subscriber location and connection is again attempted with the re-identified signalling mode.

This access routine minimizes or eliminates undesired ringing and failures to connect to a subscriber location due to changes in the loop network serving the location.

In yet a further aspect of the invention, the control means is further adapted to include a telemetry system information generation routine which permits the control means to automatically develop telemetry system information from telephone system information and user customer information. The generation routine is such that the developed telemetry system information and the user customer information for a subscriber location are linked by a common reference ID associated with the equipment at the subscriber location. Access to the subscriber location over the telemetry system can thus be established by the user addressing the control means with the reference ID.

The controls means develops the telemetry system information using a sieve process in which categories of user customer information for a particular subscriber location are compared with like categories of telephone system information associated with the different subscriber locations. For each category of information, telephone system information for a set of subscriber locations is identified based on the sieve criteria for that category. The telephone system information to be compared for each category starts with the telephone system information of the set of subscriber locations identified for the previous category. The last comparison category thus identifies telephone system information for subscriber locations most likely to be the particular subscriber location whose user customer information initiated the sieve processing.

Using the telephone system information of the sets of subscriber locations identified by the sieve processing and the user information of the particular subscriber location, the generation routine invokes the set-up routine to cause the control means to control the switching network to sequentially attempt to establish suppressed ringing connections to the subscriber locations. This is carried out in the order of subscriber locations determined by the sieve process to be the most likely candidates to be the particular subscriber location. Once a connection is established as verified by a match between the reference ID of the particular subscriber location and reference ID of the accessed subscriber location, the telephone system information of the accessed subscriber location is correlated to the user customer information of the particular subscriber information, thereby establishing the telemetry system information for the particular subscriber location.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
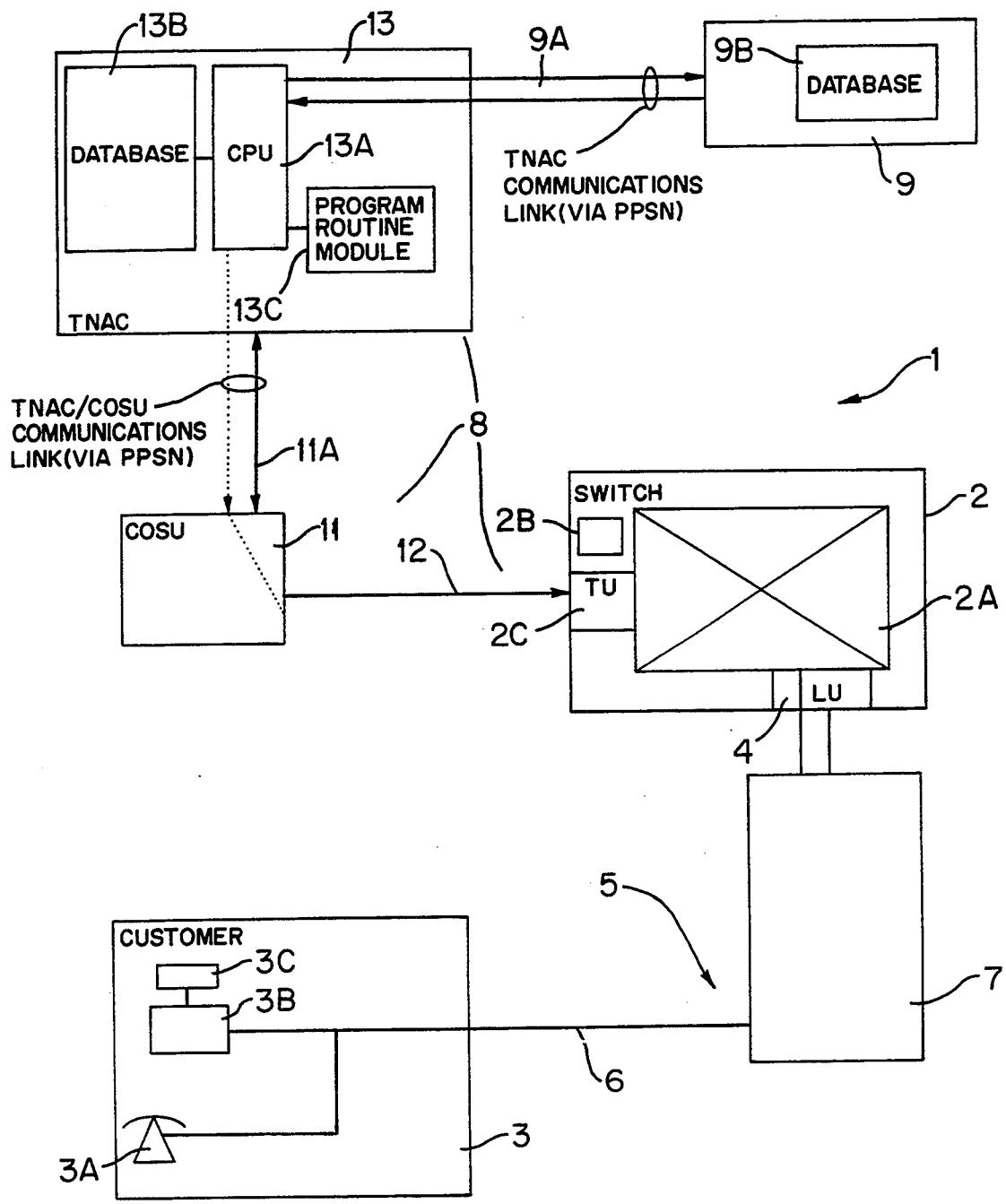
FIG. 1 shows a telemetry system in accordance with the principles of the present invention.

FIG. 1 shows a telephone telemetry system 1 in accordance with the principles of the invention. The telephone telemetry system 1 comprises a central office switch 2, shown as a program driven digital switch (e.g., an AT&T No. 5 ESS). The switch 2 includes a switching network 2A and a program controlled processor 2B. The latter controls the switching network 2A so as to provide voice path connections for communicating with subscriber locations 3 served by the switch. Communication between each subscriber location 3 and the switching network 2A occurs via a line unit 4 and a loop network 5.

The loop network 5 includes the subscriber line 6 and communication equipment 7 which can take on a variety of forms. One form is a metallic path extension of the subscriber line 6 with no electronics in the line. This form provides connectivity to the switch 2 with no signalling required from the switch. In a second form of the equipment 7, the equipment includes one or more universal digital loop carriers which can be of a non-concentrated or concentrated configuration.

In non-concentrated configuration, the universal digital loop carriers include loop gain electronics in an extension of the subscriber line 6. This configuration also allows voice path connectivity at all times without signalling from the switch. In concentrated configuration, the universal digital loop carriers again include loop gain electronics, but the electronics is shared based on timeslots. As a result, to obtain voice path connectivity a timeslot must be allocated. This is established by an off-hook condition at a subscriber location or by a ringing signal from the switch to the loop network.

Typically, three types of concentrated universal digital loop carriers are used. A so-called "type A" in which a first power ringing interval I is used for timeslot allocation, a so-called "type B" in which a second power ringing interval II is used for timeslot allocation and a so-called "type C" in which open switch interval (OSI) as defined in Bellcore-TA-NTW-000030, Issue 3, is used.

A third form of the equipment 7 comprises one or more integrated digital loop carriers which can be in non-concentrated or concentrated configuration. In these loop carriers, time shared loop gain electronics is also used so that connectivity (timeslot allocation) requires a signal to be sent by the switch 2 or a subscriber location going off-hook.

Depending upon the form of the equipment 7, a connection from the switch 2 through a loop network 5 to an associated subscriber location 3 will thus require no signalling from the switch, a signal of power ringing interval I, a signal of power ringing interval II or an OSI signal. These signalling modes can be identified to the switch by including signal codes 0, 1, 2 and 3, respectively, in the initiating signal to the switch.

Each subscriber location 3 includes a telephone station 3A and a telemetry interface unit 3B. The telemetry interface unit 3B communicates with equipment 3C, such as for example, utility meters, and allows access to this equipment when the interface unit 3B is accessed over the telemetry system.

Access to the telemetry interface unit 3B of a subscriber location 3 is accomplished via a control system 8. The control system 8 is configured to establish suppressed ringing connections through the switch 2 and each loop network 5 to the corresponding subscriber location 3. These connections are established by the control system 8 in response to messages or signals from a user computer 9 at the facility of a user of the telemetry system. A typical user might be a utility company. The user computer 9 transmits its messages to the control means 8 over a communications link (e.g., the public packet switching network) 9A.

In response to a message identifying a particular subscriber location 3, the control system 8 is adapted to establish a suppressed ringing connection to the telemetry interface unit 3B at that location. Messages can then be sent over the established connection to the interface, causing the interface to access the equipment 3C. The equipment 3C can then be directed to deliver data to the user computer 9 or to take some other action, as determined by the messages from the latter.

As shown, the control system 8 includes a central office service unit 11 and associated trunks 12. The unit 11 and the trunks 12 control the trunk unit 2C of the switch 2 to establish the desired suppressed ring connections to the subscriber locations 3. To this end, the unit 11 and trunks 12 can be similar to the central office service unit and utility telemetry trunks, respectively, described in the telemetry system of the above-mentioned '407 application, the teachings of which are incorporated herein by reference.

As set forth in such application, the trunks 12 have a class of service which identifies to the switch 2 that the connections being requested by the central office service unit 11 are to be made with ringing suppressed, i.e., with no ringing signal transmitted or with a burst of ringing signal transmitted, as is required by the particular loop network 5 serving the subscriber location. These signalling modes are indicated to the switch 2 by the unit 11 placing the appropriate signalling codes (0, 1, 2 or 3) in the message to the switch.

As noted in the '407 application, in the case of any burst signalling mode, the transmitted burst signal must be sufficiently short so that it is not present for any significant time after connection is completed. Accordingly, the central office service unit 11 can establish connections through the switch 2 over the loop networks 5 to the subscriber locations 3 which are accompanied by no or little (i.e., short) ringing.

The telemetry interface unit 3B used at the subscriber locations can also operate similarly to the meter interface units used in the '407 patent application. Thus, each interface unit 3B can respond to alert messages (either specified tone messages or digital messages as defined in Bellcore Technical Reference TR-30TSY-00283) conveyed by the switch 2 to activate or alert the unit as well as to further messages which cause the unit to activate the corresponding equipment 3C. The alert messages can be based on alert codes which define the corresponding tones or digital messages.

A control computer 13 of the control system 8 is used to control basic operation of the telemetry system 1. The control computer 13 communicates with the user computer 9 over the communication path 9A and with the central office service unit 11 over a similar communication path 11A (e.g., the public packet switched network) in carrying out its control processing. As shown, the control computer includes a central processing unit 13A, a database unit 13B and a program routine module 13C. The data base unit 13B contains telephone system information related to the subscriber locations 3 as well as telemetry system information which is a composite of the latter information and user customer information obtained from the database 9B of user computer 9. The telemetry system information is used by the control computer 13 in instructing the central office service unit 11 to make connections to specific subscriber location 3.

The user customer information stored in database 9B includes for each customer, i.e., each subscriber location 3, a telemetry interface unit identification number, ("TIUID") which identifies the interface unit 3B at each location. This identification number is also present in the telemetry system information for each subscriber location and is used as a mechanism for linking the two sets of information. As a result of this linking, access to a telemetry interface unit 3B and corresponding equipment 3C at a particular subscriber location 3 can be had by the user computer 9 transmitting a message to the control computer 13 containing the TIUID of the interface unit.

The program routine module 13C in the control computer 13 contains program routines for controlling operation of the control computer. In accord with the invention, these program routines include a set-up routine, an access routine and a telemetry system information generation routine.

The set-up routine is used by the control computer 13 when the telemetry system is brought into service or initialized, when a new subscriber location is brought into the system and when a connection to a subscriber location cannot be made. This routine identifies for each subscriber location the signalling mode required by the loop network serving the location.

The access routine is used by the control computer 13 when the user computer 9 desires access to a subscriber location 3 via the telemetry system. This access routine provides access to the subscriber locations in a way that attempts to minimize ringing at the subscriber locations as well as failures to connect to the subscriber locations due to changes in the loop networks serving the locations.

The telemetry system information generation routine is used by the control computer 13 to generate the telemetry system information from the telephone system information and the user customer information. This routine accomplishes this using the TIUID as a linking reference and using sieve processing.

Figure 2:
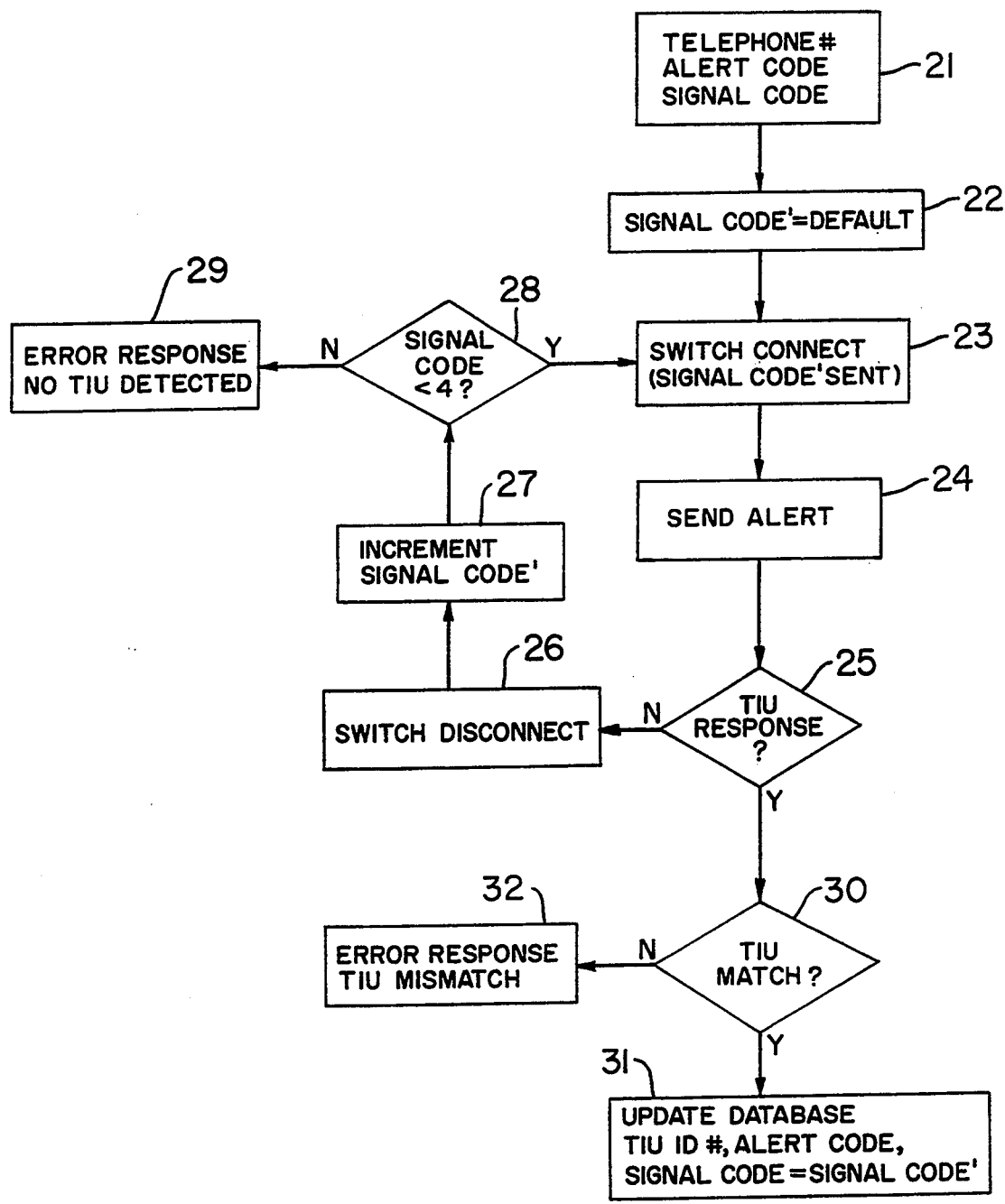
FIG. 2 shows a flow diagram for the set-up routine for the system of FIG. 1.

FIG. 2 illustrates a flow diagram showing operation of the system 1 based upon the set-up routine of the control computer 13. As above-noted, this routine identifies the signalling mode of the loop network 5 serving a subscriber location 3. This identification is made by establishing and associating one of the signal codes, i.e., 0, 1, 2, 3, with the particular loop network 5 and updating the corresponding telemetry information in the database 13B with the established code.

In step 21, the control computer 13 identifies from the telemetry system information in the database 13B, the directory or telephone number and alert code of the particular subscriber location 3 whose signalling mode is to be identified. The computer also identifies from this information, any current signalling code previously identified for the location. The latter would be present where the set-up routine is being used to re-identify the signalling mode of a loop network when a connection has failed, but would not be present where the routine is being used to initialize the system 1 or when a subscriber location is being added to the system.

In step 22, the signal code in the identified information is changed to a default signal code which, in the present example, is the 0 signal code, signifying the no signal signalling mode. In step 23, the control computer 13 sends a message with the changed signal code and directory number information to the central office service unit 11. This message requests the unit to establish a suppressed ringing connection through the switch 2 using the signalling mode identified by the signal code and to the subscriber location identified by the directory number. The central office service unit 11 acts on the request by causing the switch 2 to attempt to make the connection.

In step 24, the control computer 13, after waiting the normal time period set for the switch 2 to make a connection, sends a further request to the service unit 11. This further request instructs the service unit to send an alert message over the attempted connection, based on the alert code in the telemetry information sent with the instruction. The control computer 13 then waits for a message from the service unit 11 indicating that the service unit has received an acknowledgement signal from the subscriber location. This acknowledgement signal is generated by the interface unit 3B at the subscriber location and contains the TIUID of the interface.

In step 25, if no message is received by the control computer 13 reporting that an acknowledgement signal has been received, the switch 2 disconnects in step 26 and process move to step 27. In step 27, the control computer 13 increments the signal code and then checks in step 28 whether the incremented signal code exceeds the maximum signal code value.

If the maximum signal code value has been exceeded, process moves to step 29 wherein the control computer 13 generates an error response indicating that the subscriber location cannot be confirmed and that further checking by the telemetry system personnel is required. If in step 28, the incremented signal code does not exceed the maximum signal code value, process instead moves back to step 23 and the control computer repeats steps 23-25 based on the incremented signal code and the other telemetry system information.

In step 25, if the control computer 13 receives a message from the service unit 11 that an acknowledgement signal from the subscriber location 3 has been received, process moves to step 30. In step 30, the control computer 13 compares the TIUID in the acknowledgement signal from the accessed subscriber location, which TIUID is sent to the control computer in the message from the service unit, with the expected TIUID for the subscriber location, i.e., the TIUID in the telemetry system information for the particular subscriber location. If the TIUIDs match, the control computer 13 recognizes that the appropriate signalling mode has been identified for the subscriber location and is identified by the signal code which resulted in the match. Accordingly, process moves to step 31 in which the control computer updates its telemetry system information for the subscriber location with the identified signal code.

In step 30, if the TIUIDs do not match, process moves to step 32, wherein a further error response is generated at the control computer 13. This error response indicates that there is a mismatch between the expected and accessed TIUIDs for the subscriber location requiring further checking by the telemetry system personnel.

In performing the above set-up routine for each of the subscriber locations during initialization of the system 1 and when a new subscriber location is added, the control computer 13 automatically establishes the correct signal code for each subscriber location. Establishing these signal codes manually is thus avoided, greatly facilitating use of the telemetry system 1.

As above-noted, the control computer 13 carries out its program access routine in response to a message from the user computer 9 for access to a given subscriber location 3. As also above-noted, the access routine operates in a manner which attempts to avoid undesired system events, i.e., unwanted ringing at the subscriber locations and connection failures. The former is accomplished in the access routine by the control computer 13 causing the service unit 11 to first attempt to establish all suppressed ringing connections to the subscriber locations 3 using the 0 signal code, i.e., the no signal signalling mode. In this way, if a loop network serving a subscriber location has been changed from one requiring signalling to one that does not, unwanted ringing at the subscriber location is avoided.

If a connection is not made using the 0 signal code, the control computer 13 then attempts to establish the connection using the signal code identified in the telemetry system information for the subscriber location. In this case, if a connection cannot be established, the control computer 13 initiates the set-up routine to re-identify a signal code for the location. The access routine then utilizes the re-identified signal code to attempt to complete the connection. As a result, failures-to-connect due to changed loop networks are also avoided or minimized.

Figure 3:
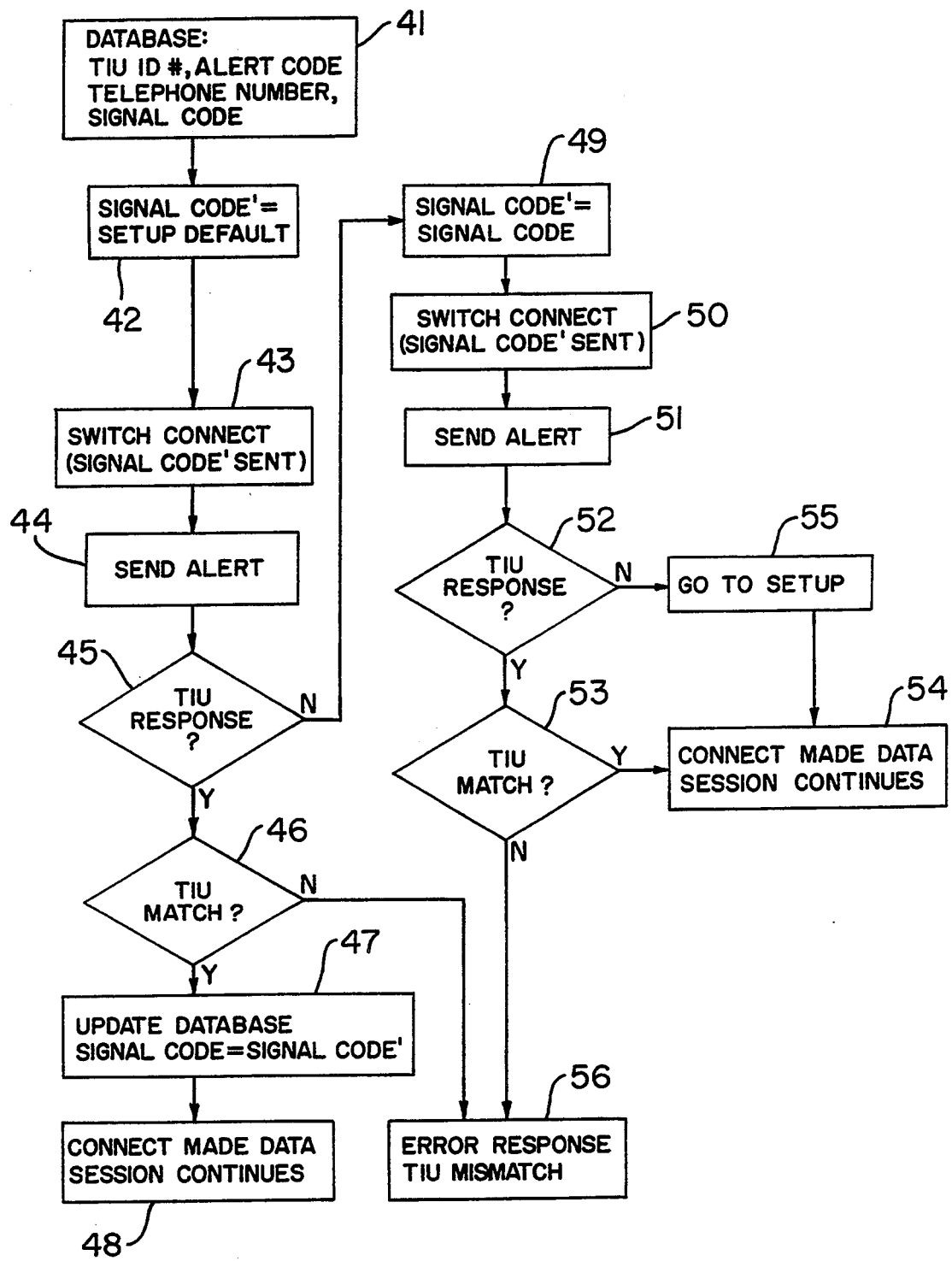
FIG. 3 shows a flow diagram for the access routine of the system of FIG. 1.

The access routine is depicted in detail in the flow diagram in FIG. 3. In step 41, the control computer 13, in response to a message from the user computer 9 requesting connection to a subscriber location 3, invokes the access routine by identifying from its database the telemetry system information associated with the subscriber location (i.e., the directory number, TIUID, alert code and signal code). This is done, as above-noted, based upon the TIUID specified in the message from the user computer. In step 42, the control computer 13 changes the signal code to the default code which is the 0 code, indicating a no signal signalling mode for the suppressed ringing connection.

In step 43, the control computer 13 then sends a message to the central office service unit 11 instructing it to attempt to establish a suppressed ringing connection to the subscriber location based upon the directory number and the default or 0 signal code. In step 44, after waiting the period for switch connection, the control computer 13 sends a message to the service unit 11 instructing the unit to send an alert signal over the attempted connection. This signal is based upon the alert code included in the message from the control computer.

In step 45, the control computer 13 waits for the service unit to send a message indicating that an acknowledgement signal containing a TIUID has been received from the subscriber location. If the control computer is sent such an acknowledgement message, which message includes the TIUID in the acknowledgement signal, process moves to step 46 wherein the control computer 13 compares the received or accessed TIUID with the expected TIUID in the telemetry information for the subscriber location. If the TIUIDs match, the control computer 13 updates the telemetry system information of the subscriber location with the default signal code in step 47. Process then moves to step 48 wherein the control computer 13, having now accessed the interface unit 3B at the subscriber location 3 over the suppressed ring connection, can now respond to further messages from the user computer 9. This permits the user computer to engage in a data session with the interface unit at the subscriber location.

In step 45, if the control computer 13 does not receive a message from the service unit 11 indicating that the service unit has received an acknowledgement signal, process moves to step 49. In step 49, the control computer 13 changes the signal code back to that identified in the telemetry system information for the subscriber location. Process then proceeds to step 50, wherein the control computer again sends a message to the service unit 11. This message requests the unit to attempt to again establish a suppressed ringing connection to the subscriber location, this time based upon the identified signal code for the subscriber location and the directory number.

In step 51, after waiting the set time period for switch connection, the control computer 13 sends a further message including an alert code to the service unit 11 requesting that the unit send an alert signal based on the alert code over the attempted connection. In step 52, the control computer 13 waits for a message from the service unit indicating that the service unit has received an acknowledgement from the subscriber location, which acknowledgement includes the TIUID of the accessed location. If the control computer receives such an acknowledgement message, process proceeds to step 53 in which the control computer compares the accessed TIUID with the expected TIUID in the telemetry system information. If the TIUIDs match, process moves to step 54 wherein the control computer 13, having accessed the interface unit 3B and the subscriber location 3, can now respond to further messages from the user computer 9 to allow a data session to proceed.

In step 53, if the control computer 13 fails to receive an acknowledgement message from the service unit 11, process moves to step 55. In step 55, the control computer 13 invokes the set-up routine which is performed to re-identify the signal code for the loop network 5 to the subscriber location. If the setup routine re-identifies a signal code and makes a connection as determined by step 31 of the routine, the connection is held by the control computer 13 and process moves again to step 54 wherein a data session can be held.

In step 53, if the TIUIDs do not match, process moves to step 56 wherein an error response is generated indicating a mismatch between the expected and accessed TIUIDs. Similarly in step 46, if no match occurs, process again moves to step 56 indicating a mismatch in TIUIDs, requiring further checking by telemetry system personnel.

Figure 4:
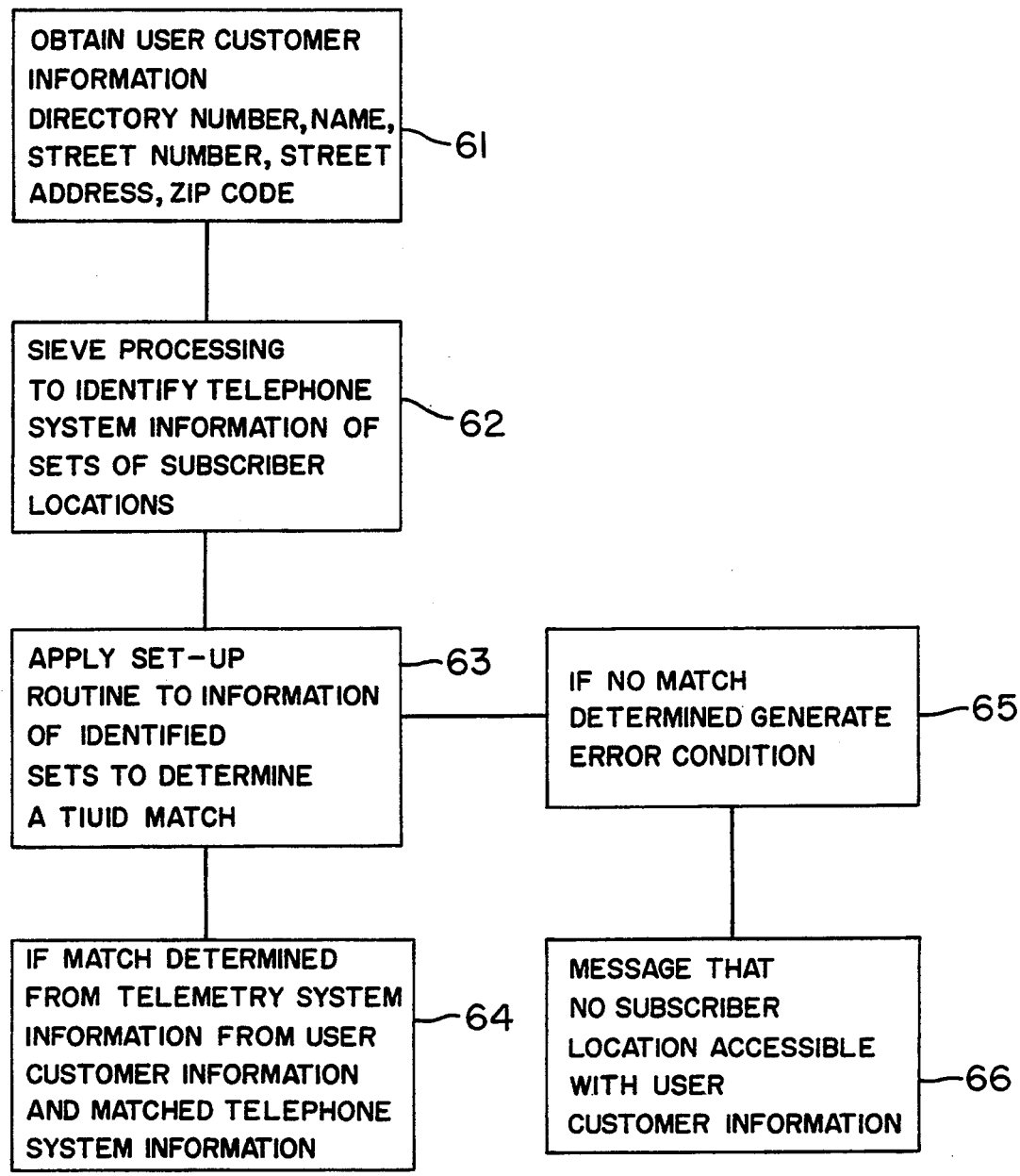
FIG. 4 shows a flow diagram for the telemetry system information generation routine for the system of FIG. 1.

As above-indicated, the telemetry system information in the database 13B of the control computer 13 is developed by the control computer using the telemetry system information generation routine. This routine is also used during initializing of the system 1 and when a new subscriber location is added to the system. With this routine, the resultant telemetry system information becomes linked to the user customer information based upon the TIUIDs of the interface units at the subscriber locations. The generation routine is depicted in detail in FIG. 4.

In step 61, the control computer 13 obtains user customer information from the user computer 9 for a given subscriber location as identified by the TIUID of the interface unit at that location. In step 62, the control computer 13 performs sieve processing of the obtained user customer information with the telephone system information in its database 13B. This processing is based on categories of common information in the user customer information and telephone system information.

The sieve processing identifies telephone system information associated with one or more sets of subscriber locations. Each set corresponds to the sieve comparison for one of the information categories. Each sieve comparison which occurs later in time is made only with telephone system information of the set of subscriber locations identified in the immediately previous comparison. The telephone system information of the set of the subscriber locations of the last comparison is thus most likely that of the given subscriber location.

In step 63, the control computer 13 attempts to establish connections to the subscriber locations in the sets of subscriber locations identified in step 62 using the telephone system information of the identified locations and the user customer information (i.e., alert code and TIUID) of the given location. This is accomplished by the control computer using the set-up routine. These attempted connections start with the set of subscriber locations identified in the last comparison and work backboard towards the set in the first comparison. Moreover, in each set, the attempts are made beginning with subscriber location most likely to be the given location based upon the sieve match criteria.

If a match is obtained in the set-up routine to a subscriber location in step 63, process proceeds to step 64 in which the control computer 13 then defines the telemetry system information for the given subscriber location as a composite of the telephone system information of the matched subscriber location and the user customer information of the given location. The telemetry system information will thus include the TIUID and access code from the user customer information and the directory number from the telephone system information.

If the set-up routine in step 63 does not result in a match, then process proceeds to step 65 in which the control computer generates an error condition. Process then proceeds to step 66 in which the control computer 13 sends a message to the user computer 9 indicating that no subscriber location is accessible over the telemetry system using the TIUID and alert code sent by the computer, requiring further checking by the user personnel.

An example of the user customer information in the user computer database 9B might be as follows:
 a) Current Customer Name b) Street Name
c) Street Number
d) ZIP Code (optionally 9 digit)
f) TIUID (High=5+Low=15, characters)
g) Alert Code Likewise, the telephone system information might include:
a) Current Customer Name
b) Street Name
c) Street Number
d) ZIP Code (optionally 9 digit)
e) Directory or Telephone Number (10 digit)

The composite telemetry system information which results from the above telephone system and user customer information in step 65 of the generation routine, might thus include the following:
a) Current Customer Name
b) Street Name
c) Street Number
d) ZIP (optionally 9 digit)
e) Telephone number (10 digit)
f) TIUID (High=5+Low=15 characters)
g) Alert Code
h) Signal Code where the signal code is developed in the set-up routine.

Figure 5:
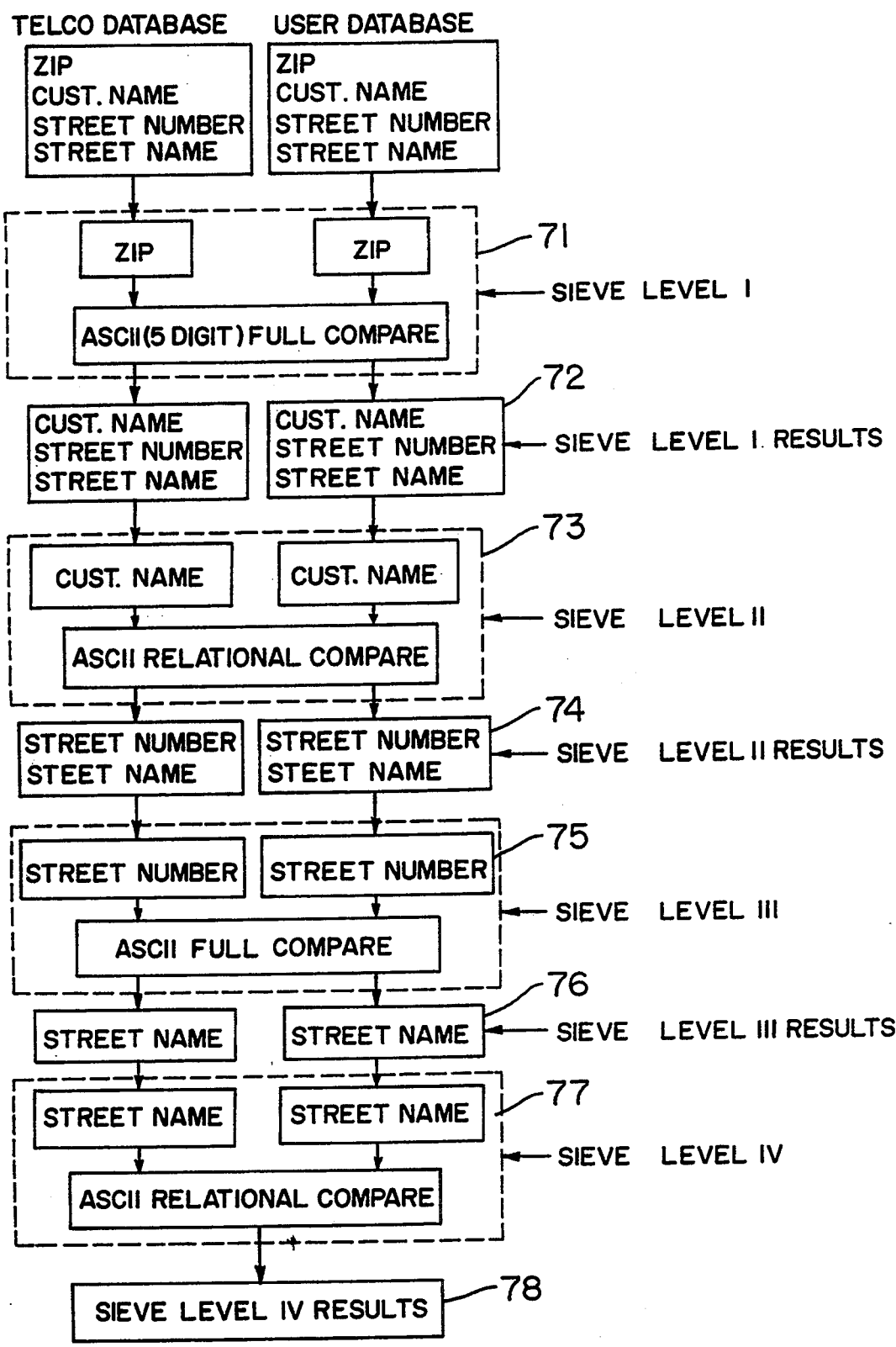
FIG. 5 shows diagrammatically the sieve processing for generation routine of FIG. 4.

FIG. 5 shows diagrammatically, the layered sieve comparison processing carried out in step 62 of the telemetry system information generation routine. As can be seen, the sieve processing is based on comparing the information in the common information categories a), b), c) and d) of the user customer and telephone system information in the following order d), a), c) and b). In step 71 (sieve level 1), the control computer 13 compares the ZIP code information of the user customer information of the given subscriber location with the ZIP codes of the telephone system information of the subscriber locations. This comparison is on a number-by-number basis (full ASCII comparison) and results in telephone system information for a first set of subscriber locations, identified in step 72 (sieve level I results).

In step 73, the user customer name information of the given subscriber location is compared with the telephone system name information for the set of subscriber locations identified in step 72. This comparison is on a letter-by-letter basis (full ASCII comparison). The results are identified in step 74 (sieve level II results) as telephone system information of a second set of subscriber locations.

In step 75, the user customer street number information of the given subscriber location is compared with the telephone system street number information of the set of subscriber locations identified in step 74. This also is on a number-by-number comparison (full ASCII comparison) and the results are identified in step 76 (sieve level III results) as telephone information of a third set of subscriber locations.

In step 77, a comparison of user customer street name information is made for the given subscriber location and the set of subscriber locations identified in step 76. This comparison is made based on matching sequences of the address information. (ASCII sequence character matching). This sequence matching is done iteratively by matching a smaller character string with a larger character string. A percentage confidence level is then developed for each comparison based upon the sieve criteria. The results of these comparisons are identified in step 78 (sieve level IV results) as telephone information of a fourth set of telephone subscriber locations.

The sieve level IV processing can be more fully described by the following steps. The street name of the given subscriber location and the street names of the set of subscriber locations identified in step 76 are first converted to upper case. The street names are then parsed in the following way: (a) each street is searched character by character looking to see if it contains a letter; (b) a ' (single quote) is ignored and a . (period) if preceded by only one letter is ignored; (c) any other character (not mentioned above) is considered a word delimiter and is not stored for the search.

A match is then begun comparing the parsed string for the name for the given subscriber location with the parsed string for the name of each identified location. In each comparison, the string with the fewer words is compared with the string with the greater words by taking each word from the shorter string and comparing each of its characters with each character of each word of the longer string. If the first characters of the words of the shorter string and longer string being compared do not match, then further comparison of these words ceases. However, comparison of the shorter string word with any remaining longer string words continues. The maximum number of matched characters for each word is then accumulated. After all words/characters have been compared the total number of matched characters is divided by the total number of characters in the longest string and then multiplied by 100 to obtain the confidence level.

As example, assume that the street name of an identified subscriber location is stored in the database 13B as "Peachtree St. NE" and that the user customer information identifies the street name of the given subscriber location as "P'tree st ne". The following comparisons would be made:

| A String | B String | # of matches |
|---|---|---|
| PTREE | PEACHTREE | 5 found |
| PTREE | ST. | 0 found |
| PTREE | NE | 0 found |
| | | maximum matches = 5 |
| ST | PEACHTREE | 0 found |
| ST | ST. | 2 found |
| ST | NE | maximum matches = 2 |
| | | accum. matches = 7 |
| NE | PEACHTREE | 0 found |
| NE | ST. | 0 found |
| NE | NE | 2 found |
| | | maximum matches = 2 |
| | | accum. matches = 9 |

The confidence level for the above would be equal to (accum. matches/total chars. in longest string) * 100. For the above illustrated case, this results in a confidence level=(9/14) * 100 =64.3.

As can be appreciated from the above, each successive sieve level comparison in the sieve processing is designed to narrow the subscriber locations in the resultant set. Also, if at any sieve level no subscriber locations are identified because no matches are achieved, the sieve results at that level are ignored and telephone system information of the previous set of subscriber locations is used as the input to the next sieve level or as input to the set-up routine. An example of this is as follows:

As above-indicated, once the sieve processing has been completed, the generation routine will conduct the set-up routine to attempt to make connections to the subscriber locations identified in the sieve processing. In the case of the sieve processing in FIG. 5, connection attempts will start with the subscribed set developed in the sieve level IV and work upward to the sieve level I until a match is achieved. Also, in the sieve level IV, comparison will start at the high confidence level information and proceed to the low confidence level information.

It should be noted that in the system of the invention, if access is attempted to a subscriber location 3 whose directory number has been changed, the attempted suppressed ring connection will result in an announcement from the switch 2 to the service unit 11. The service unit 11 will report this to the control computer 13 which will request a telephone number update based upon the previously stored old telephone number and street address information.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the functions of the control computer 13 and/or the central office service unit 11 can be included in the switch 2, if desired.

What we claim is:

1. A telemetry system for accessing equipment at telephone subscriber locations over telephone loop networks which require different signalling modes for initiating operation, said equipment at each subscriber location generating an acknowledgement signal when accessed, and said system comprising:

a telephone switching network for providing access to said subscriber locations over said telephone loop networks serving said subscriber locations;

and first means for controlling said telephone switching network so as to establish suppressed ringing connections through said telephone switching network to said subscriber locations over said telephone loop networks for accessing said equipment, said first means including a set-up routine for identifying the signalling mode of the telephone loop network serving a subscriber location by: controlling said telephone switching network to sequentially attempt to establish a suppressed ringing connection through said telephone switching network to the subscriber location over the telephone loop network serving the subscriber location using a different one of said signalling modes during each said attempt; after each said attempt waiting for an acknowledgement from the equipment at the subscriber location before proceeding with a next attempt; and after an acknowledgement is received, ceasing any subsequent attempts and identifying the telephone loop network serving the subscriber location with the signalling mode which resulted in said acknowledgement.

2. A system in accordance with claim 1 wherein:
said signalling modes include: a first signalling mode in which no signal is required to initiate operation of the telephone loop network having this signalling mode; and further signalling modes in which burst signals are required to initiate operation of the loop networks having these signalling modes.

3. A system in accordance with claim 1 wherein:
the equipment at each subscriber location has an identification code and said equipment acknowledges access to said equipment by transmitting a signal including said identification code;

the different signalling modes have different signal codes;

and said identifying of the telephone loop network serving a subscriber location with the signalling mode which resulted in an acknowledgement comprises correlating the identification code of the equipment at the subscriber location with the signalling code of the signalling mode identified for the telephone loop network serving that subscriber location.

4. A system in accordance with claim 3 wherein:
each subscriber location has a directory number;
and the correlating of the identification code of the equipment at a subscriber location with the signalling code of the telephone loop network serving the subscriber location includes associating the directory number of the subscriber location with the correlated identification and signal codes.

5. A system in accordance with claim 4 wherein:
the equipment at each subscriber location has an alert code;
and said alert code for the equipment at a subscribe location is associated with the directory number and identification and signal codes of that subscriber location.

6. A system in accordance with claim 3 wherein:
the equipment at each subscriber location includes an interface unit and said identification code of the equipment is the identification code of the interface unit.

7. A system in accordance with claim 3 wherein:
said ceasing of said attempts and identifying the telephone loop network does not occur until the identification code in the received acknowledgement matches an identification code expected for the equipment at the subscriber location.

8. A system in accordance with claim 7 wherein:
if said ceasing of said attempts and identifying of a loop network does not occur after said identification means has attempted to establish suppressed ringing connections using all of said signalling codes, said identification means generates an error signal.

9. A system in accordance with claim 1 wherein:
said telephone loop networks include different types of loop carriers which require said different signalling modes for initiating operation.

10. A system in accordance with claim 1 wherein:
said first means further includes an access routine which said first means uses to establish suppressed ringing connections through said telephone switching network to said subscriber locations to access equipment at said subscriber locations in response to access requests from a user.

11. A system in accordance with claim 10 wherein:
if said first means is unable to establish a suppressed ringing connection to a subscriber location using said access routine, said first means invokes said set-up routine to re-identify a signal code for the subscriber location,
and said first means if able to re-identify a signal code for the subscriber location after invoking said set-up routine invoking said access routine to attempt to establish said suppressed ringing connection using said re-identified signal code.

12. A system in accordance with claim 11 wherein:
said user has user customer information related to said subscriber locations and said telemetry system includes telephone system information related to said subscriber locations;
and said first means further includes a telemetry system generation routine which automatically generates for each subscriber location telemetry system information containing certain of the user customer information and certain of the telephone system information related to the subscriber location.

13. A system in accordance with claim 12 wherein:
said user customer information includes a reference identification (ID) associated with the equipment at each subscriber location;
said telephone system information includes a directory number associated with each subscriber location;
and said telemetry system information for a subscriber location includes said directory number in the customer information associated with the subscriber location and the reference identification (ID) in the user customer information associated with the subscriber location.

14. A system in accordance with claim 13 wherein:
said access requests of said user include reference IDs.

15. A system in accordance with claim 13 wherein:
each subscriber location acknowledges accessing of the equipment at that subscriber location by the telemetry system using an acknowledgement signal which includes the reference identification (ID) associated with that subscriber location
said first means carries out said telemetry system information generation routine by: comparing the user customer information related to a particular subscriber location with the telephone system information for said subscriber locations to identify telephone system information for at least one set of subscriber locations; causing said first means to control said switching network to sequentially attempt to establish suppressed ringing connections to the subscriber locations in each set of subscriber locations until an acknowledgement signal is received from an accessed subscriber location having a reference identification (ID) which matches the reference identification (ID) associated with the particular subscriber location; and forming the telemetry system information for the particular subscriber location by combining certain of the user customer information related to the particular subscriber location with certain of the telephone system information of the accessed subscriber location.

16. A telemetry system for accessing equipment at telephone subscriber locations over telephone loop networks which require different signalling modes for initiating operation, said different signalling modes including a first signalling mode and at least one second signalling mode and each subscriber location having a signalling mode currently identified with the telephone loop network serving the subscriber location, said system comprising:
a telephone switching network for providing access to said subscriber locations over said telephone loop networks serving said subscriber locations;
and first means for controlling said telephone switching network so as to establish a suppressed ringing connection through said telephone switching network over a particular telephone loop network serving a particular subscriber location for accessing the particular subscriber location, said first means having an access routine including: first attempting to establish said suppressed ringing connection through said telephone switching network using said first signalling mode; and, if said first attempt to establish said suppressed ringing connection fails, further attempting to establish said suppressed ringing connection using the signalling mode currently identified with the particular telephone loop network serving the particular subscriber location.

17. A system in accordance with claim 16 wherein:
said first signalling mode is one in which no signal transmission is required to initiate operation of the loop network having that signalling mode.

18. A system in accordance with claim 17 wherein:
each second signalling mode requires burst signal transmission of predetermined extent to initiate operation of the telephone loop network having that signalling mode.

19. A system in accordance with claim 16 wherein:
said equipment at each subscriber location when accessed generates an acknowledgement signal;
and said first means recognizes a suppressed ringing connection has been established upon receipt of an acknowledgement signal from the equipment at the particular subscriber location.

20. A system in accordance with claim 19 wherein:
said first means, if said acknowledgement signal is not an expected acknowledgement signal, generates an error signal.

21. A system in accordance with claim 16 wherein:
said first means has a set-up routine for identifying the signalling mode of the telephone loop network serving a subscriber location;
said first means, if said further attempt to establish said suppressed ringing connection fails, invokes said set-up routine to re-identify the signalling mode for the subscriber location;
and said first means, if said invoked set-up routine re-identifies a signalling mode for the subscriber location, attempts to establish the suppressed ringing connection using the re-identified signalling mode.

22. A system in accordance with claim 21 wherein:
said set-up routine includes for a particular subscriber location: controlling said telephone switching network to sequentially attempt to establish a suppressed ringing connection through said telephone switching network to the subscriber location over the telephone loop network serving the subscriber location using a different one of said signalling modes during each said attempt; after each said attempt waiting for an acknowledgement from the equipment at the subscriber location before proceeding with a next attempt; and after an acknowledgement is received, ceasing any subsequent attempts and identifying the loop network serving the subscriber location with the signalling mode which resulted in said acknowledgement.

23. A telemetry system for use in accessing equipment at subscriber locations for which said telemetry system contains telephone system information related to said subscriber locations, said subscriber locations defining customers of a user of the telemetry system which user is to access said equipment through said telemetry system, said user having user customer information related to said subscriber locations, the telephone system comprising:
a telephone switching network for providing communication to said subscriber locations through said telephone switching network;
and first means for controlling said telephone switching network to provide a suppressed ringing connection to a particular subscriber location through said telephone switching network, said first means including a telemetry system information generation routine which automatically generates for a subscriber location telemetry system information containing certain of the customer user information and certain of the telephone system information related to the particular subscriber location.

24. A system in accordance with claim 23 wherein:
said user customer information includes a reference identification (ID) associated with the equipment at each subscriber location;
and the telemetry system information for the particular subscriber location includes the reference identification (ID) associated with the equipment at the particular subscriber location.

25. A system in accordance with claim 24 wherein:
said telephone system information includes a directory number associated with each subscriber location;
and said telemetry system information for the particular subscriber location includes a directory number associated with the particular subscriber location.

26. A system in accordance with claim 24 wherein:
each subscriber location acknowledges accessing of the equipment at that subscriber location by the telemetry system using an acknowledgement signal which includes the reference identification (ID) associated with that subscriber location
said first means carries out said telemetry system information generation routine by: comparing the user customer information related to the particular subscriber location with the telephone system information for at least one set of subscriber locations; causing said first means to control said telephone switching network to sequentially attempt to establish suppressed ringing connections to the subscriber locations in each set of subscriber locations until an acknowledgement signal is received from an accessed subscriber location having a reference identification (ID) which matches the reference identification (ID) associated with the particular subscriber location; and forming the telemetry system information for the particular subscriber location by combining certain of the user customer information related to the particular subscriber location with certain of the telephone system information of the accessed subscriber location.

27. A telemetry system in accordance with claim 26 wherein:
said telephone system information for each subscriber location includes a plurality of categories of information;
said user customer information for each subscriber location includes a plurality of categories of information some of which are common with the categories of information of said telephone system information for that subscriber location;
and said comparing includes layered sieve processing in which each category of user customer information of the particular subscriber location is compared with the information in the common category of telephone system information of other of said subscriber locations to identify the telephone system information of each set of subscriber locations, each of said comparisons of said layered sieve processing identifying the telephone system information of one set of subscriber locations and each comparison starting with the telephone system information of the set of subscriber locations identified in the previous comparison.

28. A telemetry system in accordance with claim 27 wherein:
said comparison of said user customer information in a first category with the telephone system information of a subscriber location in said first category requires a complete match of the compared information for the telephone system information to be included in the identified telephone system information of the one set of subscriber locations associated with that first category;
and said comparison of said user information in a second category with the telephone system information of a subscriber location in said second category requires a partial match of the compared information for the telephone system information to be included in the identified telephone system information of the one set of subscriber locations associated with that second category.

29. A telemetry system in accordance with claim 28 wherein:
said control of said switching network to sequentially attempt said suppressed ringing connections is carried out starting with the telephone system information of the set of subscriber locations which is last determined in said sieve processing and is continued working backward toward the telephone system information of the set of subscriber locations which is first determined in said sieve processing.

30. A telemetry system in accordance with claim 29 wherein:
said control of said switching network to sequentially attempt said suppressed ringing connections is carried out for the telephone system information of a particular set of subscriber locations starting with the subscriber location whose telephone system information matched the user telephone system information with the highest degree of confidence and continuing with subscriber locations whose telephone system information matched the user telephone system information in the order of decreasing degrees of confidence.

31. A method for accessing equipment at telephone subscriber locations over telephone loop networks which require different signalling modes for initiating operation, said equipment at each subscriber location generating an acknowledgement signal when accessed, and said method comprising:

accessing said subscriber locations over said telephone loop networks serving said subscriber locations through a telephone switching network;

and controlling said telephone switching network so as to establish suppressed ringing connections through said telephone switching network to said subscriber locations over said telephone loop networks for accessing said equipment, said controlling including using a set-up routine for identifying the signalling mode of the telephone loop network serving a subscriber location by: controlling said telephone switching network to sequentially attempt to establish a suppressed ringing connection through said telephone switching network to the subscriber location over the telephone loop network serving the subscriber location using a different one of said signalling modes during each said attempt; after each said attempt waiting for an acknowledgement from the equipment at the subscriber location before proceeding with a next attempt; and after an acknowledgement is received, ceasing any subsequent attempts and identifying the telephone loop network serving the subscriber location with the signalling mode which resulted in said acknowledgement.

32. A method in accordance with claim 31 wherein: said signalling modes include: a first signalling mode in which no signal is required to initiate operation of the telephone loop network having this signalling mode; and further, signalling modes in which burst signals are required to initiate operation of the loop networks having these signalling modes.

33. A method in accordance with claim 31 wherein: the equipment at each subscriber location has an identification code and said equipment acknowledges access to said equipment by transmitting a signal including said identification code;

the different signalling modes have different signal codes;

and said identifying of the telephone loop network serving a subscriber location with the signalling mode which resulted in an acknowledgement comprises correlating the identification code of the equipment at the subscriber location with the signalling code of the signalling mode identified for the telephone loop network serving that subscriber location.

34. A method in accordance with claim 33 wherein: each subscriber location has a directory number;

and the correlating of the identification code of the equipment at a subscriber location with the signalling code of the telephone loop network serving the subscriber location includes associating the directory number of the subscriber location with the correlated identification and signal codes.

35. A method in accordance with claim 34 wherein: the equipment at each subscriber location has an alert code;

and said alert code for the equipment at a subscriber location is associated with the directory number and identification and signal codes of that subscriber location.

36. A method in accordance with claim 33 wherein: the equipment at each subscriber location includes an interface unit and said identification code of the equipment is the identification code of the interface unit.

37. A method in accordance with claim 33 wherein: said ceasing of said attempts and identifying the telephone loop network does not occur until the identification code in the received acknowledgement matches an identification code expected for the equipment at the subscriber location.

38. A method in accordance with claim 37 wherein: if said ceasing of said attempts and identifying of a loop network does not occur after said identification means has attempted to establish suppressed ringing connections using all of said signalling codes, said identification means generates an error signal.

39. A system in accordance with claim 31 wherein: said telephone loop networks include different types of loop carriers which require said different signalling modes for initiating operation.

40. A method in accordance with claim 31 wherein: said controlling further includes using an access routine to establish suppressed ringing connections through said switching network to said subscriber locations to access equipment at said subscriber locations in response to access requests from a user.

41. A method in accordance with claim 40 wherein: if a suppressed ringing connection to a subscriber location is unable to be established using said access routine, invoking said set-up routine to re-identify a signal code for the subscriber location, and if said invoked set-up routine is able to re-identify a signal code for the subscriber location, invoking said access routine to attempt to establish said suppressed ringing connection using said re-identified signal code.

42. A method in accordance with claim 41 wherein: said user has user customer information related to said subscriber locations and said method includes storing telephone system information related to said subscriber locations;

and said controlling further includes using a telemetry system generation routine to automatically generate for each subscriber location telemetry system information containing certain of the user customer information and certain of the telephone system information related to the subscriber location.

43. A method in accordance with claim 42 wherein: said user customer information includes a reference identification (ID) associated with the equipment at each subscriber location;

said telephone system information includes a directory number associated with each subscriber location;

and said telemetry system information for a subscriber location includes said directory number in the customer information associated with the subscriber location and the reference identification (ID) in the user customer information associated with the subscriber location.

44. A method in accordance with claim 43 wherein:

said access requests of said user include reference IDs.

45. A method in accordance with claim 43 wherein:
each subscriber location acknowledges accessing of the equipment at that subscriber location using an acknowledgement signal which includes the reference identification (ID) associated with that subscriber location;
said first means carries out said telemetry system information generation routine by: comparing the user customer information related to a particular subscriber location with the telephone system information for said subscriber locations to identify telephone system information for at least one set of subscriber locations; causing said switching network to sequentially attempt to established suppressed ringing connections to the subscriber locations in each set of subscriber locations until an acknowledgement signal is received from an accessed subscriber location having a reference identification (ID) which matches the reference identification (ID) associated with the particular subscriber location; and forming the telemetry system information for the particular subscriber location by combining certain of the user customer information related to the particular subscriber location with certain of the telephone system information of the accessed subscriber location.

46. A method for accessing equipment at telephone subscriber locations over telephone loop networks which require different signalling modes for initiating operation, said different signalling modes including a first signalling mode and at least one second signalling mode and each subscriber location having a signalling mode currently identified with the telephone loop network serving the subscriber location, said method comprising:
accessing said subscriber locations over said telephone loop networks serving said subscriber locations through a telephone switching network;
and controlling said telephone switching network so as to establish a suppressed ringing connection through said telephone switching network over a particular telephone loop network serving a particular subscriber location for accessing the particular subscriber location, said controlling including using an access routine comprising: first attempting to establish said suppressed ringing connection through said telephone switching network using said first signalling mode; and, if said first attempt to establish said suppressed ringing connection fails, further attempting to establish said suppressed ringing connection using the signalling mode currently identified with the particular telephone loop network serving the particular subscriber location.

47. A method in accordance with claim 46 wherein:
said first signalling mode is one in which no signal transmission is required to initiate operation of the loop network having that signalling mode.

48. A method in accordance with claim 47 wherein:
each second signalling mode requires burst signal transmission of predetermined extent to initiate operation of the telephone loop network having that signalling mode.

49. A system in accordance with claim 46 wherein:
said equipment at each subscriber location when accessed generates an acknowledgement signal; and a suppressed ringing connection is recognized as having been established upon receipt of an acknowledgement signal from the equipment at the particular subscriber location.

50. A method system in accordance with claim 49 wherein:
if said acknowledgement signal is not an expected acknowledgement signal, an error signal is generated.

51. A method in accordance with claim 46 wherein:
said controlling further includes use of a set-up routine for identifying the signalling mode of the telephone loop network serving a subscriber location;
if said further attempt to establish said suppressed ringing connection fails, invoking said set-up routine to re-identify the signalling mode for the subscriber location;
and if said invoking of said set-up routine re-identifies a signalling mode for the subscriber location, attempting to establish the suppressed ringing connection using the re-identified signalling mode.

52. A method in accordance with claim 51 wherein:
said set-up routine includes for a particular subscriber location: controlling said telephone switching network to sequentially attempt to establish a suppressed ringing connection through said telephone switching network to the particular subscriber location over the telephone loop network serving the particular subscriber location using a different one of said signalling modes during each said attempt; after each said attempt waiting for an acknowledgement from the equipment at the subscriber location before proceeding with a next attempt; and after an acknowledgement is received, ceasing any subsequent attempts and identifying the loop network serving the particular subscriber location with the signalling mode which resulted in said acknowledgement.

53. A method for use in accessing equipment at subscriber locations having related telephone system information, said subscriber locations defining customers of a user, which user is to access said equipment and has user customer information related to said subscriber locations, the method comprising:
communicating with said subscriber locations through a telephone switching network;
and controlling said telephone switching network to provide a suppressed ringing connection to a particular subscriber location through said telephone switching network, said controlling including a telemetry system information generation routine which automatically generates for a subscriber location telemetry system information containing certain of the customer user information and certain of the telephone system information related to the particular subscriber location.

54. A method in accordance with claim 53 wherein:
said user customer information includes a reference identification (ID) associated with the equipment at each subscriber location;
and the telemetry system information for the particular subscriber location includes the reference identification (ID) associated with the equipment at the particular subscriber location.

55. A method in accordance with claim 54 wherein:
said telephone system information includes a directory number associated with each subscriber location;

and said telemetry system information for the particular subscriber location includes a directory number associated with the particular subscriber location.

56. A method in accordance with claim 54 wherein:

each subscriber location acknowledges accessing of the equipment at that subscriber location by using an acknowledgement signal which includes the reference identification (ID) associated with that subscriber location;

and said system information generation routine includes: comparing the user customer information related to the particular subscriber location with the telephone system information for said subscriber locations to identify telephone system information for at least one set of subscriber locations; controlling said telephone switching network to sequentially attempt to establish suppressed ringing connections to the subscriber locations in each set of subscriber locations until an acknowledgement signal is received from an accessed subscriber location having a reference identification (ID) which matches the reference identification (ID) associated with the particular subscriber location; and forming the telemetry system information for the particular subscriber location by combining certain of the user customer information related to the particular subscriber location with certain of the telephone system information of the accessed subscriber location.

57. A method in accordance with claim 56 wherein:

said telephone system information for each subscriber location includes a plurality of categories of information;

said user customer information for each subscriber location includes a plurality of categories of information some of which are common with the categories of information of said telephone system information for that subscriber location;

and said comparing includes layered sieve processing in which each category of user customer information of the particular subscriber location is compared with the information in the common category of telephone system information of other of said subscriber locations to identify the telephone system information each set of subscriber locations, each of said comparisons of said layered sieve processing identifying the telephone system information of one set of subscriber locations and each comparison starting with the telephone system information of the set of subscriber locations identified in the previous comparison.

58. A method in accordance with claim 57 wherein:

said comparison of said user customer information in a first category with the telephone system information of a subscriber location in said first category requires a complete match of the compared information for the telephone system information to be included in the identified telephone system information of the one set of subscriber locations associated with that first category;

and said comparison of said user information in a second category with the telephone system information of a subscriber location in said second category requires a partial match of the compared information for the telephone system information to be included in the identified telephone system information of the one set of subscriber locations associated with that second category.

59. A method in accordance with claim 58 wherein:

said control of said switching network to sequentially attempt said suppressed ringing connections is carried out starting with the telephone system information of the set of subscriber locations which is last determined in said sieve processing and is continued working backward toward the telephone system information of the set of subscriber locations which is first determined in said sieve processing.

60. A method in accordance with claim 59 wherein:

said control of said switching network to sequentially attempt said suppressed ringing connections is carried out for the telephone system information of a particular set of subscriber locations starting with the subscriber location whose telephone system information matched the user telephone system information with the highest degree of confidence and continuing with subscriber locations whose telephone system information matched the user telephone system information in the order of decreasing degrees of confidence.

* * * * *